United States Patent
Yu et al.

(10) Patent No.: US 12,294,311 B2
(45) Date of Patent: May 6, 2025

(54) AUXILIARY PRE-CHARGING DEVICE OF POWER CONVERTER, PRE-CHARGING METHOD AND POWER CONVERTER

(71) Applicant: Eaton Intelligent Power Limited, Dublin (IE)

(72) Inventors: Jianxiong Yu, Shanghai (CN); Jiajie Duan, Shanghai (CN); Han Li, Shanghai (CN); Cheng Luo, Shanghai (CN); Qiang Chen, Shanghai (CN)

(73) Assignee: Eaton Intelligent Power Limited, Dublin (IE)

( * ) Notice: Subject to any disclaimer, the term of this patent is extended or adjusted under 35 U.S.C. 154(b) by 40 days.

(21) Appl. No.: 17/534,176

(22) Filed: Nov. 23, 2021

(65) Prior Publication Data

US 2022/0302848 A1 Sep. 22, 2022

(30) Foreign Application Priority Data

Nov. 25, 2020 (CN) .......................... 202011336465.6

(51) Int. Cl.
  *H02M 1/36* (2007.01)
  *H02M 5/458* (2006.01)

(52) U.S. Cl.
  CPC ........... *H02M 5/4585* (2013.01); *H02M 1/36* (2013.01)

(58) Field of Classification Search
  CPC ............. H02M 1/36; H02M 3/335–42; H02M 5/45–4585
  See application file for complete search history.

(56) References Cited

U.S. PATENT DOCUMENTS

| | | | |
|---|---|---|---|
| 10,686,385 B2 * | 6/2020 | Brown | H02J 7/00 |
| 10,917,023 B2 * | 2/2021 | Chen | H02M 7/487 |
| 2009/0261790 A1 * | 10/2009 | Arduini | H02M 3/33592 363/21.06 |
| 2016/0241137 A1 * | 8/2016 | Sun | H02M 3/33573 |

* cited by examiner

*Primary Examiner* — Peter M Novak
(74) *Attorney, Agent, or Firm* — Stanek Lemon Crouse & Meeks, PA

(57) ABSTRACT

The present invention provides an auxiliary pre-charging device for a power converter. The power converter includes at least one power unit with an input end being connected to a medium and high voltage AC power source, and an output end being connected to a low voltage DC bus, wherein the auxiliary pre-charging device includes a switch, a transformer, a pre-charging resistor, and a rectifier sequentially connected in series, one end of the switch is connected to the medium and high voltage AC power source, and an output end of the rectifier is connected to the low voltage DC bus. The present invention also provides a pre-charging method for a power converter, which uses the aforementioned auxiliary pre-charging device to start pre-charging at the low-voltage output end of the power converter.

7 Claims, 4 Drawing Sheets

//AUXILIARY PRE-CHARGING DEVICE OF POWER CONVERTER, PRE-CHARGING METHOD AND POWER CONVERTER

CROSS-REFERENCE TO RELATED APPLICATIONS

The present application claims priority to Chinese Patent Application No. 202011336465.6; Filed Nov. 25, 2020, entitled AUXILIARY PRE-CHARGING DEVICE OF POWER CONVERTER, PRE-CHARGING METHOD AND POWER CONVERTER that is incorporated herein by reference in its entirety.

TECHNICAL FIELD

The present invention belongs to the field of electric power sources, in particular relates to an auxiliary pre-charging device for a power converter, a pre-charging method and a power conversion device including the auxiliary pre-charging device.

BACKGROUND ART

In an application of an ultra-large-scale power source, a high voltage (HV) or medium voltage (MV) power converter is capable of achieving higher power density, higher power, and lower weight.

Reference is made to FIG. 1 showing a circuit topology of a medium voltage converter based on cascaded electric bridges in the prior art. The medium voltage converter allows medium voltage AC input and low voltage DC output and has a low voltage DC side which may be directly used for the low voltage DC output and may also be connected with a DC/DC or DC/AC circuit to perform DC and AC output. The medium voltage converter includes a filter inductor 1, a rectifier 2, and a bidirectional isolated DC/DC circuit, wherein a bidirectional active electric bridge including a primary electric bridge 3 and a secondary electric bridge 4 isolated by a transformer is used as an exemplary representation manner of the bidirectional isolated DC/DC circuit. Each phase of three-phase input lines L1, L2, and L3 for medium voltage AC input is connected with n (n≥2) cascaded (connected in series with each other) rectifiers (AC/DC converters), then, all the rectifiers are connected in parallel for output after being converted by bidirectional active electric bridges, one of the rectifiers and one of the bidirectional active electric bridges form one power unit (as shown in FIG. 1), input ends of all the power units are connected in series with each other, and output ends of the power units are connected in parallel with each other. Specifically, 10 kV input AC power is converted into DC power with the total voltage of 9600 V by the rectifier 2 after being filtered by the filter inductor 1 and is then converted into 800 V low voltage DC power by a bidirectional active electric bridge. Voltages before and after passing through the transformer are different, for example, generally, potentials on the rectifier 2 and the primary electric bridge 3 are 10 kV, while the secondary electric bridge is in low potential, and therefore, it is necessary to arrange auxiliary power sources for DC buses on front and rear sides of the transformer and perform pre-charging FIG. 2 is a schematic diagram showing a circuit structure of an exemplary power unit of a medium voltage converter based on cascaded H bridges. A 10 kV medium voltage input is sequentially input to a first active bridge DAB1 and a second active bridge DAB2 after being rectified by cascaded H bridges (CHB) via a first switch K1, a second switch K2, and a pre-charging resistor R1, the first active bridge DAB1 and the second active bridge DAB2 are isolated by the transformer, one end of a third switch K3 is connected to a node between the first switch K1 and the second switch K2, the other end is connected to a node between the pre-charging resistor R1 and the CHB, the CHB is connected in parallel with a first capacitor C1, and the second active bridge DAB2 is connected in parallel with a second capacitor C2. Controlled working modes of the CHB, the DAB1, and the DAB2 need control signals provided by a child control 1 and a child control 2 and power sources provided by an auxiliary power source 1 and an auxiliary power source 2. In addition, the auxiliary power sources 1 and 2 also respectively supply stabilized voltages to the child controls 1 and 2. It may be understood by the skilled in the art that FIG. 2 only shows one power unit of the medium voltage converter, and therefore, one CHB is only shown. A plurality of CHBs are connected in series to form cascaded H bridges, the number of the cascaded H bridges is directly related to an input voltage, the larger the number of the cascaded H bridges, the higher the input voltage which may be borne. Further reference is made to FIG. 2 in which the first switch K1 is a switch of a main power circuit, and the pre-charging resistor R1 is used for limiting an impact current at the moment when the first switch K1 is turned on, which is due to the fact that if the first capacitor C1 has no voltage, the first capacitor C1 at the moment when the first switch K1 is turned on is equivalent to be short-circuited to result in particularly high current impact. During electrification, K1 is turned on firstly, and then, K2 is turned on; at the moment, the auxiliary power source 1 is not started due to incapability of drawing power from the DC bus of the first capacitor C1, and therefore, the CHB works in an uncontrolled rectification state of a parasitic diode; generally, in order to ensure pre-charging voltage equalization of the DC bus of the CHB, two ends of the first capacitor C1 are required to be connected in parallel with large resistors (unshown in the figure) for static voltage equalization. When the first capacitor C1 is charged to a threshold voltage, the auxiliary power source 1 may draw power from the DC bus of the first capacitor C1 to generate required auxiliary power, and the auxiliary power is used for supplying power to a driving and control device of a semiconductor switch of the CHB via the child control 1. After the auxiliary power source 1 is capable of normally working, the semiconductor switch of the CHB may be controlled to work, the CHB is switched from an uncontrolled rectification mode to an active rectification mode, at the moment, the pre-charging resistor R1 does not play a role any more; and in order to reduce the system loss, the third switch K3 is turned on to make the pre-charging resistor R1 short-circuited, and then, the second switch K2 is turned off to ensure that the circuit of the R1 is cut off thoroughly.

The CHB has stably worked in the controlled active rectification mode, and therefore, the first active bridge DAB1 starts to work, thereby charging the capacitor C2 with the DC bus on a low voltage side. The CHB and the first active bridge DAB1 are both located on a primary side of the transformer so as to have the same potential, the auxiliary power source 1 is also capable of supplying auxiliary power for driving the semiconductor switch of the first active bridge DAB1 via the child control 1 so that the first active bridge DAB1 works in a controlled active inversion state, and generated AC power is transferred to the second active bridge DAB2 side via the transformer. At the moment, the capacitor C2 on the second active bridge DAB2 side is not charged, and therefore, in order to avoid the impact current at the moment of electrification, the DAB1 is required to be changed from narrow to wide during impulse adjustment, and thus, soft starting is achieved. Similarly, at the moment, the DAB2 works in the uncontrolled rectification state, the auxiliary power source 2 is capable of drawing power from C2 to work only when the parasitic diode takes part in working until the second capacitor C2 is charged to a certain threshold voltage, and a controller and a driver of the DAB2 may be powered by the auxiliary power source 2 via the child control 2 to work in an active full-control mode. Hereto, a pre-charging process is completed, and the medium voltage converter normally works.

It may be seen from the aforementioned introductions that there are the following problems in a pre-charging manner of a traditional medium voltage converter:

two additional medium voltage switches K2 and K3 are needed, so that the size is overlarge, and the cost is overhigh;

the three-phase pre-charging resistor R1 is needed, so that more components are needed, and the size of a cabinet is increased; and meanwhile, due to an insulation requirement, pre-charging resistors respectively arranged in a three-phase circuit are required to be arranged at a large enough distance during installation, which also results in overlarge size of the cabinet; and in order to avoid pre-charging non-uniformity, the first capacitor C1 needs to be connected in parallel with a voltage equalizing resistor with a large resistance value, which also results in the increment of the size and cost of the cabinet.

In a word, in a traditional method for pre-charging the medium voltage power converter, additional bulky resistors and contactors are required to be arranged on a medium voltage power grid side, which undoubtedly reduces the power density and increases the cost of equipment and the cost.

SUMMARY OF THE INVENTION

Therefore, the objective of the present invention is to provide an auxiliary pre-charging device for a power converter to overcome the aforementioned defects in the prior art. The power converter includes at least one power unit with an input end being connected to a medium and high voltage AC power source, and an output end being connected to a low voltage DC bus, wherein the auxiliary pre-charging device includes a switch, a transformer, a pre-charging resistor, and a rectifier sequentially connected in series, one end of the switch is connected to the medium and high voltage AC power source, and an output end of the rectifier is connected to the low voltage DC bus.

For the auxiliary pre-charging device in accordance with the present invention, preferably, the pre-charging resistor and the rectifier are low voltage elements.

For the auxiliary pre-charging device in accordance with the present invention, preferably, the power converter includes at least two power units, input ends of all of the at least two power units are connected in series with each other and are connected to a medium and high voltage power source, and output ends of all of the at least two power units are connected to a low voltage DC bus in a manner of parallel connection with each other.

For the auxiliary pre-charging device in accordance with the present invention, preferably, each of the at least two power units includes a main power switch, a rectifier bridge, a first capacitor, a first electric bridge, a main transformer, a second electric bridge, and a second capacitor, wherein one end of the main power switch is connected to the medium and high voltage power source, the other end is connected to the rectifier bridge, an output end of the rectifier bridge is connected to two ends of the first capacitor, an input end of the first electric bridge is connected to two ends of the first capacitor, an output end is connected to a primary side of the main transformer, a secondary side of the main transformer is connected to an input end of the second electric bridge, an output end of the second electric bridge is connected to two ends of the second capacitor, and two ends of the second capacitor are connected to the low voltage DC bus.

For the auxiliary pre-charging device in accordance with the present invention, preferably, each of the at least two power units further includes a first auxiliary power source and a second auxiliary power source as well as a first child control and a second child control, wherein the first auxiliary power source is used for supplying power to the first child control and supplying power for active working modes of the rectifier bridge and the first electric bridge, the second auxiliary power source is used for supplying power to the second child control and supplying power for an active working mode of the second electric bridge, the first child control is used for controlling the active working modes of the rectifier bridge and the first electric bridge, the second child control is used for controlling the active working mode of the second electric bridge, the first auxiliary power source is connected to a DC bus of the first capacitor, and the second auxiliary power source is connected to a DC bus of the second capacitor.

For the auxiliary pre-charging device in accordance with the present invention, preferably, the rectifier bridge is an H bridge.

In another aspect, the present invention provides an pre-charging method for a power converter, wherein the auxiliary pre-charging device in accordance with the claims is used to start pre-charging at a low-voltage output end of the power converter.

The pre-charging method for a power converter in accordance with the present invention, preferably, includes the following steps:

turning off a main power switch, pre-charging a second capacitor by an auxiliary pre-charging device;

when the second capacitor is pre-charged to a preset first threshold voltage of the second capacitor, starting a second auxiliary power source, and controlling, by a second child control, a second electric bridge to work in an active mode;

controlling pulse width modulation of the second electric bridge from narrow to wide, and performing pre-charging on a first capacitor from the second electric bridge to a first electric bridge;

when a voltage of the first capacitor reaches a preset first threshold voltage of the first capacitor, starting a first auxiliary power source, and controlling, by a first child control, the first electric bridge and a rectifier bridge to work in an active mode;

turning on the main power switch, further charging the first capacitor via the rectifier bridge;

when the voltage of the first capacitor reaches a preset second threshold voltage of the first capacitor, starting a normal working mode from the first electric bridge to the second electric bridge; and when the second capacitor is pre-charged to a preset second threshold voltage of the second capacitor in the normal working mode, cutting off the auxiliary pre-charging device.

In further aspect, the present invention provides a power conversion device, including the auxiliary pre-charging device in accordance with the present invention and a power converter.

Compared with the prior art, the present invention has the advantages:

(1) charging starts from a low voltage side, while voltages of all paralleled branch circuits on the low voltage side are the same, and therefore, all the paralleled branch circuits can share a pre-charging circuit, only one pre-charging switch and one pre-charging resistor are needed, requirements on safety specification distances for installation on a medium voltage side are omitted, and meanwhile, one medium voltage switch K3 is saved;

(2) an auxiliary pre-charging circuit is arranged on the low voltage side, the transformer T can adopt a medium voltage element with low power and small size, and the pre-charging resistor R1 and the rectifier Rec can adopt low voltage elements so as to be low in power, small in size, free of long-term heat radiation requirements and low in cost; and (3) a charging sequence is from a low voltage to a medium voltage, and therefore, the reliability and the safety are high.

BRIEF DESCRIPTION OF THE DRAWINGS

Embodiments of the present invention will be further described below with reference to accompanying drawings, in which.

DETAILED DESCRIPTION OF THE INVENTION

In order to make objectives, technical solutions and advantages of the present invention clearer and more understandable, the present invention will be further described in detail below in conjunction with the accompanying drawings and specific embodiments. It should be understood that the specific embodiments described herein are merely intended to explain the present invention, rather than to limit the present invention.

Figure 1:
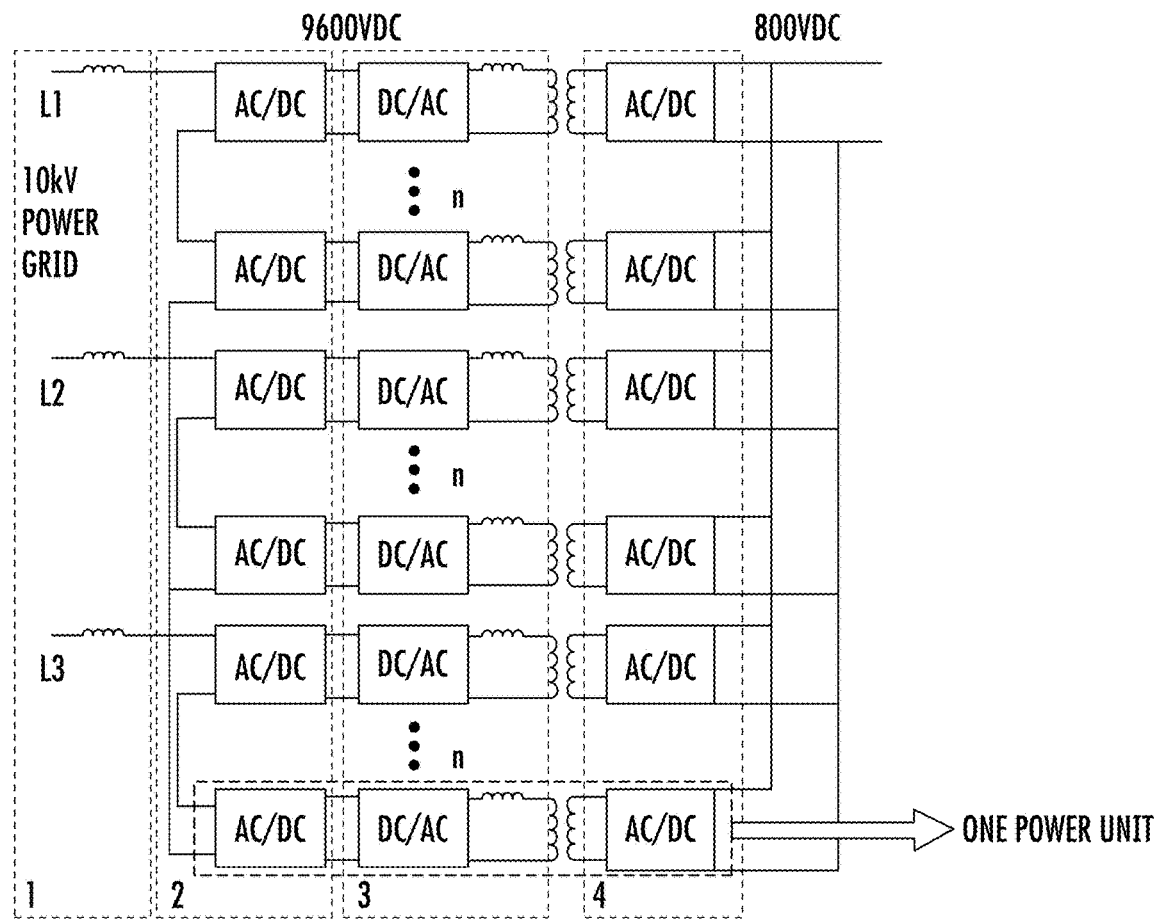
FIG. 1 shows a circuit topology of a medium voltage power converter based on cascaded electric bridges in the prior art.
Figure 2:
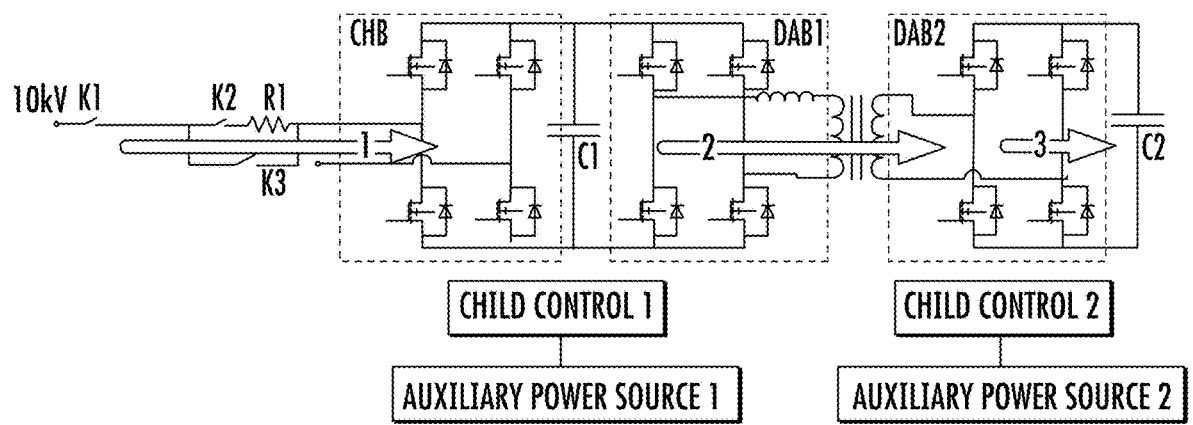
FIG. 2 is a schematic diagram showing a circuit structure of an exemplary power unit of a medium voltage power converter based on cascaded H bridges in the prior art.
Figure 3:
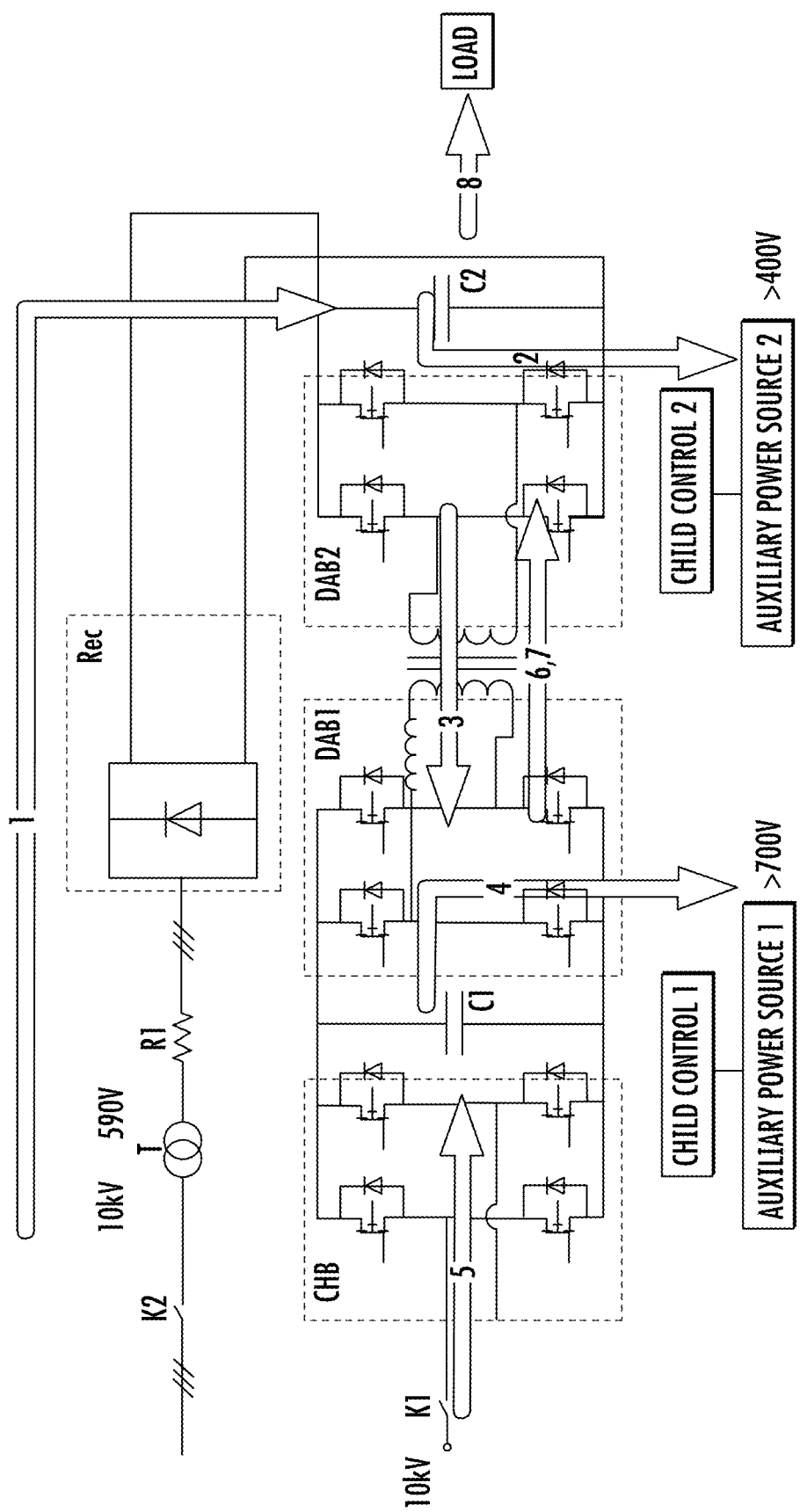
FIG. 3 is a diagram showing a pre-charging circuit of one power unit of a medium voltage converter based on cascaded H bridges in accordance with an embodiment of the present invention.
Figure 4C:
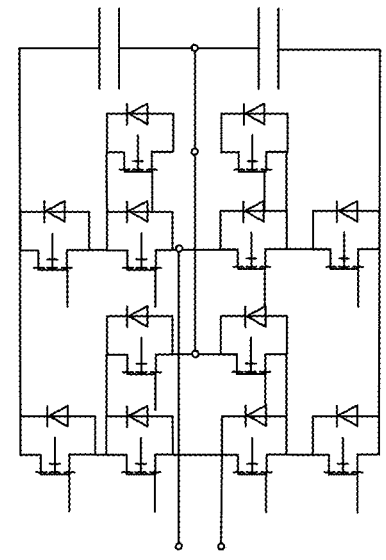
FIGS. 4A-4F respectively show a half bridge, a three-level full bridge, an active three-level full bridge, a passive three-level full bridge, a device serial-connection full bridge and a device serial-connection half bridge.
Figure 4B:
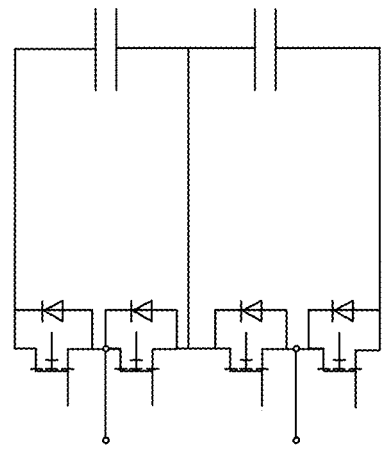
Figure 4A:
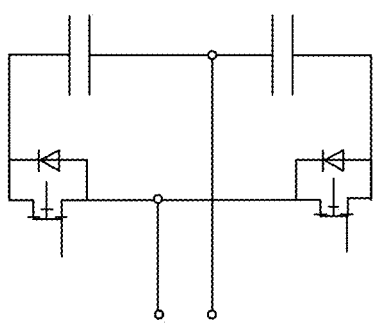
Figure 4F:
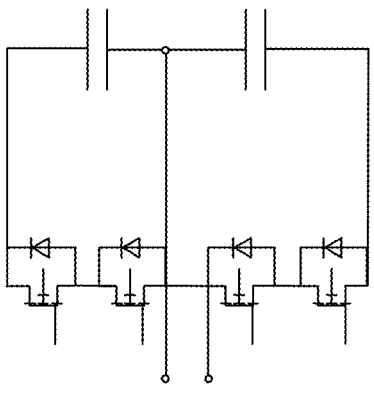
Figure 4E:
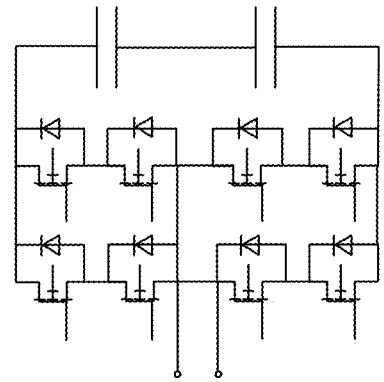
Figure 4D:
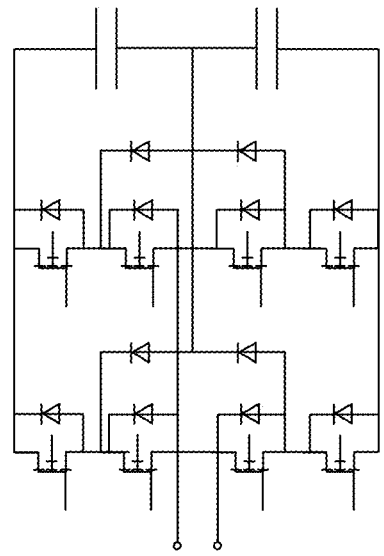

Reference is made to FIG. 3 showing a pre-charging circuit topology of one power unit of a medium voltage converter based on cascaded H bridges in accordance with an embodiment of the present invention. Compared with the prior art as shown in FIG. 2, the present embodiment lies in that a switch K2 and a pre-charging resistor R1 on a medium voltage side of a medium voltage converter are moved to a low voltage bus side and are connected in series with a transformer T and a rectifier Rec. As shown in FIG. 3 in which an 10 kV medium voltage input is input to a CHB via a main power switch K1, an output of the CHB is connected to two ends of a first capacitor C1 so as to be input to a first active bridge DAB1, an output of the first active bridge DAB1 is connected to a primary side of the transformer, a secondary side of the transformer is connected to an input of a second active bridge DAB2, and an output of the second active bridge DAB2 is connected to two ends of a second capacitor C2 so as to supply power to a load. Similarly, controlled working modes of the CHB, the DAB1, and the DAB2 need control signals provided by a child control 1 and a child control 2 and power sources provided by an auxiliary power source 1 and an auxiliary power source 2, and the auxiliary power sources 1 and 2 also respectively supply stabilized voltages to the child controls 1 and 2. In addition, on a low voltage side of the power converter, a 10 kV medium voltage power source is connected to the two ends of the second capacitor C2 via the switch K2, the transformer T, the pre-charging resistor R1, and the rectifier Rec sequentially. The switch K2, the transformer T, the pre-charging resistor R1 and the rectifier Rec form an auxiliary pre-charging device.

A pre-charging sequence in the present embodiment is described as follows:

firstly, the switch K1 is turned off, meanwhile, the switch K2 is turned on, and the auxiliary pre-charging device is electrified, at the moment, the pre-charging resistor R1 plays a role in limiting a current on the low voltage side to supply current limiting resistance to uncontrolled rectification of the rectifier Rec, and thus, the rectifier Rec charges the second capacitor C2. Herein, the auxiliary power source 2 is only pre-charged for a short time via a DC bus of the capacitor C2, then, the auxiliary power source 2 supplies a stabilized voltage to the child control 2, the power is within 5 kW and is generally 2 to 3 kW only, and there are no long-term heat radiation requirements, so that the rectifier Rec, the pre-charging resistor R1 and the transformer T may be very small in size.

When the second capacitor C2 is pre-charged to a preset first threshold voltage (such as 400 V), the auxiliary power source 2 is capable of drawing power from the second capacitor C2 to work, the first threshold voltage corresponds to a voltage at which the auxiliary power source 2 may be started, at the moment, the auxiliary power source 2 supplies power to a controller and a driver of the second active bridge DAB2 via the child control 2, and the child control 2 controls the second active bridge DAB2 to work in an active full-control mode; and pulse width modulation of the second active bridge DAB2 is controlled from narrow to wide, and pre-charging is performed on the first capacitor C1 from the second active bridge DAB2 side to the first active bridge DAB1 side, at the moment, the auxiliary power source 1 on the first active bridge DAB1 side does not draw power from the first capacitor C1, and the first active bridge DAB1 works in an uncontrolled rectification mode.

When a voltage of the first capacitor C1 reaches to a preset first threshold voltage (such as 700 V), the auxiliary power source 1 starts to draw power from the DC bus of the first capacitor C1 so as to supply power to drivers and controllers of the first active bridge DAB1 and the CHB via the child control 1, the first threshold voltage corresponds to a voltage at which the auxiliary power source 1 may be started, and preferably, the first threshold voltage corresponds to a voltage at which it is ensured that no impact current is generated at the moment when the CHB works, and the child control 1 is used for controlling active full-control working modes of the first active bridge DAB1 and the CHB;

then, the switch K1 is turned on, the CHB works in a full-control rectification mode, and the first capacitor C1 has been charged to a relatively high level, and therefore, no impact current may be generated at the moment when the CHB works; and when the first capacitor C1 is controlled to a preset second threshold voltage (such as 800 V) by the CHB, a diode of the first active bridge DAB1 may be automatically turned off, the second threshold voltage corresponds to a voltage at which the diode of the DAB1 is automatically turned off, and preferably, the second threshold voltage corresponds to voltages of two ends of the first capacitor C1 when the medium voltage converter normally works. The second active bridge DAB2 is also required to be stopped from being turned on or off, which means that the DAB2 originally outputs pulse width from narrow to wide, square waves finally stabilized at a certain pulse width charge the capacitor of the CHB via the diode of the DAB1, which is an open-loop working process (no feedback for control on a closed loop), however, the capacitor of the CHB has reached the second threshold voltage, the diode of the DAB1 is turned off therewith, and therefore, the DAB2 has not been incapable of maintaining the previous working state. At the moment, the DAB2 needs to stop the open-loop working state and to be matched with the DAB1 to form a working mode that a normal bidirectional active bridge (DAB) transfers energy from the DAB1 to the DAB2 to control a voltage of a DC capacitor of the DAB2 to be stabilized.

Then, a normal working mode from the first electric bridge DAB1 to the second electric bridge DAB2 starts; and when the second capacitor C2 is charged to a second threshold voltage (such as 800 V) in the normal working mode, the pre-charging diode of the rectifier Rec is naturally turned off, the switch K2 is turned off, the overall pre-charging process is over, and the second capacitor C2 starts to supply power to the load.

In the present embodiment, the transformer T is small in size due to low power and short working time; the rectifier Rec is capable of performing uncontrolled rectification, low in power and short in working time and is located on the low voltage side so as to be small in size and low in cost; and the pre-charging resistor R1 is a low voltage element and is low in power, small in size, free of long-term heat radiation requirements and low in cost.

Therefore, the pre-charging manner for the medium voltage converter based on the cascaded H bridges in the present embodiment has the advantages that:

(1) charging starts from a low voltage side, while voltages of all paralleled branch circuits on the low voltage side are the same, and therefore, all the paralleled branch circuits can share a pre-charging circuit, only one pre-charging switch and one pre-charging resistor are needed, requirements on safety specification distances for installation on a medium voltage side are omitted, and meanwhile, one medium voltage switch K3 is saved;

(2) an auxiliary pre-charging circuit is arranged on the low voltage side, the transformer T can adopt a medium voltage element with low power and small size, and the pre-charging resistor R1 and the rectifier Rec can adopt low voltage elements so as to be low in power, small in size, free of long-term heat radiation requirements and low in cost; and (3) a charging sequence is from a low voltage to a medium voltage, and therefore, the reliability and the safety are high.

It may be understood by the skilled in the art that the H bridge in the aforementioned embodiments may be replaced with any other electric bridges known in the art, such as a half bridge, a three-level full bridge, an active three-level full bridge, a passive three-level full bridge, a device serial-connection full bridge and a device serial-connection half bridge shown in FIG. 4 (A) to (F). When the power converter is formed by cascade based on any one or more of the aforementioned electric bridges, pre-charging may be performed in the manner in the aforementioned embodiment, and the low voltage side is provided with a switch, a transformer, a pre-charging resistor, and rectifier, the charging sequence thereof is the same as that in the aforementioned embodiment.

Figure 5:
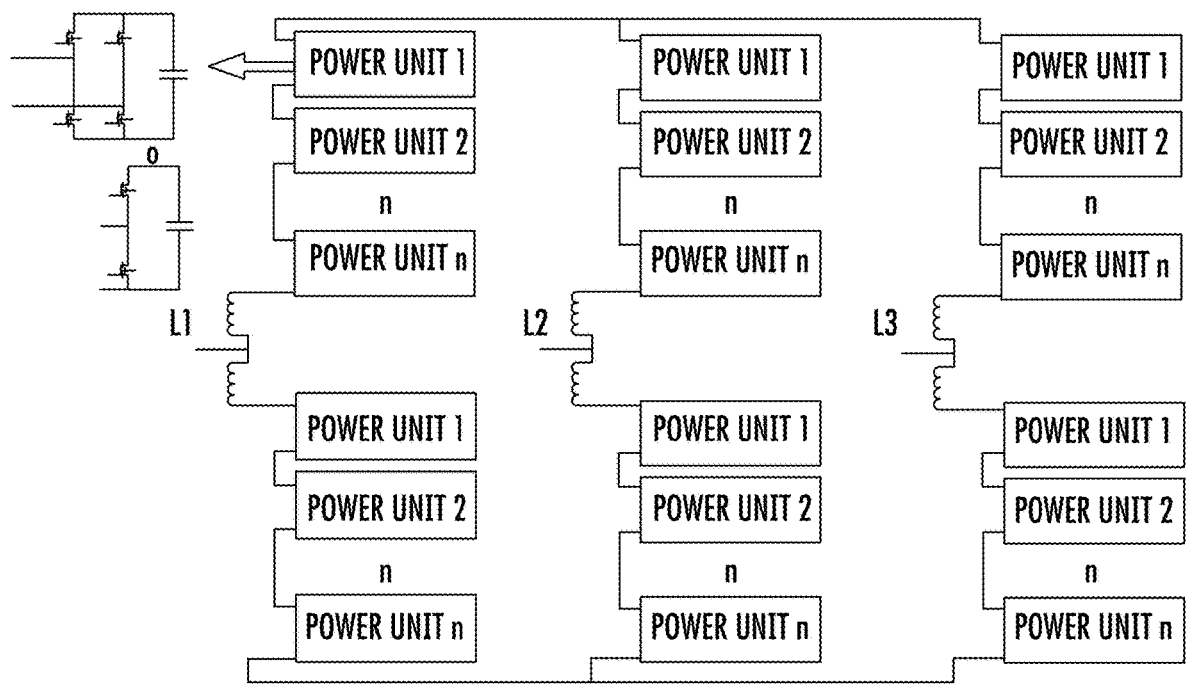
FIG. 5 is a schematic diagram showing a circuit structure of cascaded electric bridges in accordance with another embodiment of the present invention.

According to another embodiment of the present invention, a circuit structure of cascaded electric bridges in the present invention is shown as FIG. 5 in which each phase of a power source is respectively connected two groups of cascaded electric bridges connected in parallel with each other, each of the cascaded electric bridges adopts an electric bridge known in the art, such as the full bridge or half bridge as shown at the top left corner of the FIG. 5. When the circuit structure as shown in FIG. 5 is pre-charged, each of two paralleled output ends of the circuit structure is provided with the aforementioned similar auxiliary pre-charging circuit.

According to other embodiments of the present invention, a medium and high voltage converter known in the art may adopt the aforementioned similar auxiliary pre-charging circuit to perform pre-charging, the higher the voltage on the input side, the large the number of the cascaded electric bridge. It may be understood by the skilled in the art that a medium and high voltage converter only including one power unit may also adopt the aforementioned similar auxiliary pre-charging circuit to perform pre-charging.

Figure 6:
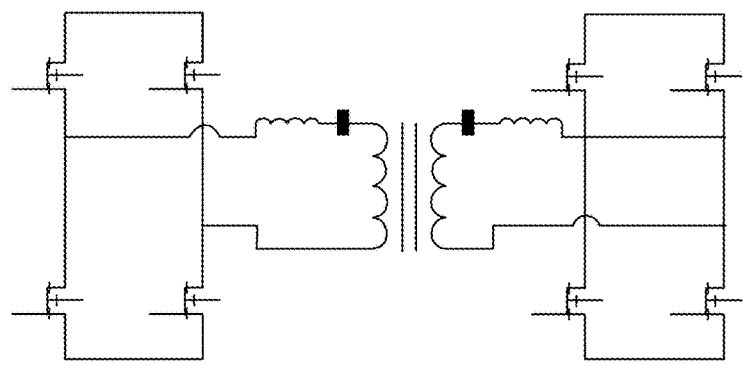
FIG. 6 shows a circuit structure of a bidirectional isolated DC/DC circuit in accordance with other embodiments of the present invention.

According to other embodiments of the present invention, in each power unit, a bidirectional isolated DC/DC circuit on the rear end of the rectifier is not limited to the structure shown in the aforementioned embodiments and may adopt a bidirectional isolated DC/DC circuit in any manner known in the art, such as the structure as shown in FIG. 6.

Seen from the contents disclosed as above, in order to reduce the number of devices on the medium voltage side of the medium voltage converter in the present invention, the concept of starting to perform pre-charging from a bus on the low voltage side is creatively formed, so that more low-voltage low-power components may be used to achieve the same function, not only are the size of an overall machine system and the weight of the system reduced, but also the manufacturing cost of equipment is greatly reduced.

Although the present invention has been described with reference to the preferred embodiments, the present invention is not limited to the embodiments described herein. The present invention further includes various changes and variations made without departing from the scope of the present invention.

The invention claimed is:

1. An auxiliary pre-charging device for a power converter that comprises at least one power unit with an input connected to an AC power source and an output connected to a DC bus, the at least one power unit comprising an AC/DC converter and a bidirectional DC/DC converter connected in series between the input and the output of the at least one power unit, and the auxiliary pre-charging device comprising: a switch, a transformer, a resistor, and a rectifier connected in series, wherein a first terminal of the switch is configured to be connected to the AC power source and wherein an output of the rectifier is configured to be connected to the DC bus, wherein the DC bus connected to the output of the power unit is identical to the DC bus connected to the rectifier.

2. The auxiliary pre-charging device of claim 1, wherein the resistor and the rectifier are low voltage elements.

3. The auxiliary pre-charging device of claim 1, wherein the power converter comprises at least two power units having inputs connected in series with each other and to the AC power source and outputs connected in parallel with each other and to the DC bus.

4. A power conversion device comprising the auxiliary pre-charging device of claim 1 and the power converter.

5. The auxiliary pre-charging device of claim 3, wherein each of the at least two power units comprises a main power switch, a rectifier bridge, a first capacitor, a first electric bridge, a main transformer, a second electric bridge, and a second capacitor, wherein a first terminal of the main power switch is connected to the AC power source and a second terminal of the main power switch is connected to the rectifier bridge, wherein an output of the rectifier bridge is connected to the first capacitor, wherein an input of the first electric bridge is connected to the first capacitor, wherein an output of the first electric bridge is connected to a primary side of the main transformer, wherein a secondary side of the main transformer is connected to an input of the second electric bridge, wherein an output of the second electric bridge is connected to the second capacitor, and wherein the second capacitor is connected to the DC bus.

6. The auxiliary pre-charging device of claim 5, wherein each of the at least two power units further comprises a first auxiliary power source, a second auxiliary power source, a first child control circuit and a second child control circuit, wherein the first auxiliary power source is configured to supply power to the first child control circuit and the rectifier bridge and the first electric bridge, wherein the second auxiliary power source is configured to supply power to the second child control circuit and the second electric bridge, wherein the first child control circuit is configured to control the rectifier bridge and the first electric bridge, wherein the second child control circuit is configured to control the second electric bridge, wherein the first auxiliary power source is connected to the first capacitor, and wherein the second auxiliary power source is connected to a the second capacitor.

7. The auxiliary pre-charging device of claim 5, wherein the rectifier bridge is an H bridge.

* * * * *